United States Patent
Balasubramanian

(10) Patent No.: US 7,502,788 B2
(45) Date of Patent: Mar. 10, 2009

(54) METHOD FOR RETRIEVING CONSTANT VALUES USING REGULAR EXPRESSIONS

(75) Inventor: Srinivasan Balasubramanian, Madurai (IN)

(73) Assignee: International Business Machines Corporation, Armonk, NY (US)

( * ) Notice: Subject to any disclaimer, the term of this patent is extended or adjusted under 35 U.S.C. 154(b) by 469 days.

(21) Appl. No.: 11/269,486

(22) Filed: Nov. 8, 2005

(65) Prior Publication Data

US 2007/0112731 A1     May 17, 2007

(51) Int. Cl.
G06F 17/30 (2006.01)
G06F 15/16 (2006.01)

(52) U.S. Cl. .................. 707/6; 707/3; 707/4; 707/5; 707/10

(58) Field of Classification Search ............ 707/3, 707/6, 2, 4, 5, 10
See application file for complete search history.

(56) References Cited

U.S. PATENT DOCUMENTS

| | | | |
|---|---|---|---|
| 5,835,892 A * | 11/1998 | Kanno | 704/257 |
| 5,978,801 A * | 11/1999 | Yuasa | 707/6 |
| 6,487,666 B1 * | 11/2002 | Shanklin et al. | 726/23 |
| 7,191,177 B2 * | 3/2007 | Konaka | 707/6 |
| 2003/0182310 A1 * | 9/2003 | Charnock et al. | 707/104.1 |
| 2003/0187843 A1 | 10/2003 | Seward | |
| 2004/0015909 A1 | 1/2004 | Cho et al. | |
| 2004/0187110 A1 | 9/2004 | Boyfield | |
| 2005/0091037 A1 | 4/2005 | Haluptzok et al. | |

* cited by examiner

*Primary Examiner*—Tony Mahmoudi
*Assistant Examiner*—Md. I Uddin
(74) *Attorney, Agent, or Firm*—Gibb Intellectual Proper Law Firm, LLC

(57) ABSTRACT

Disclosed is a method of retrieving constant values. The method comprises compiling key-value pairs into a unified regular expression, evaluating the unified regular expression against a transformed input string to match a particular key and extracting the constant value associated with that particular key. The input string in transformed by linking different tags associated with each key-value pair in the unified regular expression into a single linked tag and linking the single linked tag to the input string. Additionally, the method provides for associating the constant value in each key-value pair with an un-fixed key (i.e., a unique regular expression) as opposed to a fixed key, so that different input strings can be matched to the same key.

2 Claims, 2 Drawing Sheets

METHOD FOR RETRIEVING CONSTANT VALUES USING REGULAR EXPRESSIONS

BACKGROUND OF THE INVENTION

1. Field of the Invention

The invention relates to an associative memory array and more particularly, to a method for retrieving a constant value associated with a particular key using a unified regular expression.

2. Description of the Related Art

An associative memory array comprises a plurality of key-value pairs in which each key is associated with one constant value. A key-value lookup is an operation of retrieving the constant value associated with a particular key. This operation can be performed by software systems operating under a variety of programming languages (e.g., C++, Perl, Java, etc.). Generally, two different data structures represent associative arrays: hash tables and binary tress. In either data structure, upon receiving a query, the lookup operation matches the query exactly to a particular key and then extracts the associated constant value. Typically, keys are fixed in that they contain no restrictions, exceptions, alternatives or qualifications (e.g., keys can be represented by a fixed number, word, phrase, etc.). Therefore, the query must match exactly with a particular key to retrieve the associated constant value. Requiring keys to be fixed makes using associative memory arrays for large scale systems impractical. Additionally, to identify a match typically each query must be evaluated against each of the keys in the associative array until a match is found. Requiring each key to be evaluated separately against the query until a match is found can be time-consuming and, thus, costly and inefficient. Therefore, there is a need for a method of retrieving constant values (i.e., performing a lookup operation) for keys that are not fixed (i.e., keys that may have restrictions, exceptions, alternatives, or qualifications) and for retrieving constant values more efficiently.

SUMMARY OF THE INVENTION

In view of the foregoing, embodiments of the invention provide a computer-implemented method of retrieving constant values in an associative memory array using unified regular expressions.

Specifically, a plurality of key-value pairs is provided. Each key-value pair comprises a particular key and a constant value associated that particular key. Each particular key is unique and can be either fixed or un-fixed. For example, for each key-value pair the particular key can be either a unique fixed word, number, phrase, etc. or a unique regular expression.

A unified regular expression is formed with the key-value pairs. Specifically, the unified regular expression can be written with each of the key-value pairs having a marker between the particular key and the constant value for that particular key. Thus, for each of the key-value pairs, the associated marker and the associated constant value form a different tag.

Additionally, an "OR" logical connective can be disposed between each of the key-value pairs. Optionally, the lengths for each of the particular keys in each key value pair can be determined so that the particular keys can be incorporated into unified regular expression in predetermined order based on the lengths (e.g., a descending order).

Once the unified regular expression is formed, a single linked tag can be formed by concatenating the different tags (i.e., the markers and constant values) from all of the key-value pairs. Once formed, this single linked tag is stored for later use.

Upon receiving an input string (i.e., a query), the input string is transformed by linking the input string to the stored single linked tag. The transformed input string is then evaluated against the unified regular expression to identify a match between a single particular key (e.g., a fixed or un-fixed key) in the unified regular expression and the same key in the transformed input string. After identifying a match, a single constant value associated with the single particular key can be retrieved. Additionally, the transformed input string and single constant value can be stored for future use.

These, and other, aspects and objects of the present invention will be better appreciated and understood when considered in conjunction with the following description and the accompanying drawings. It should be understood, however, that the following description, while indicating embodiments of the present invention and numerous specific details thereof, is given by way of illustration and not of limitation. Many changes and modifications may be made within the scope of the present invention without departing from the spirit thereof, and the invention includes all such modifications.

BRIEF DESCRIPTION OF THE DRAWINGS

The invention will be better understood from the following detailed description with reference to the drawings, in which.

DETAILED DESCRIPTION OF PREFERRED EMBODIMENTS OF THE INVENTION

Figure 1:
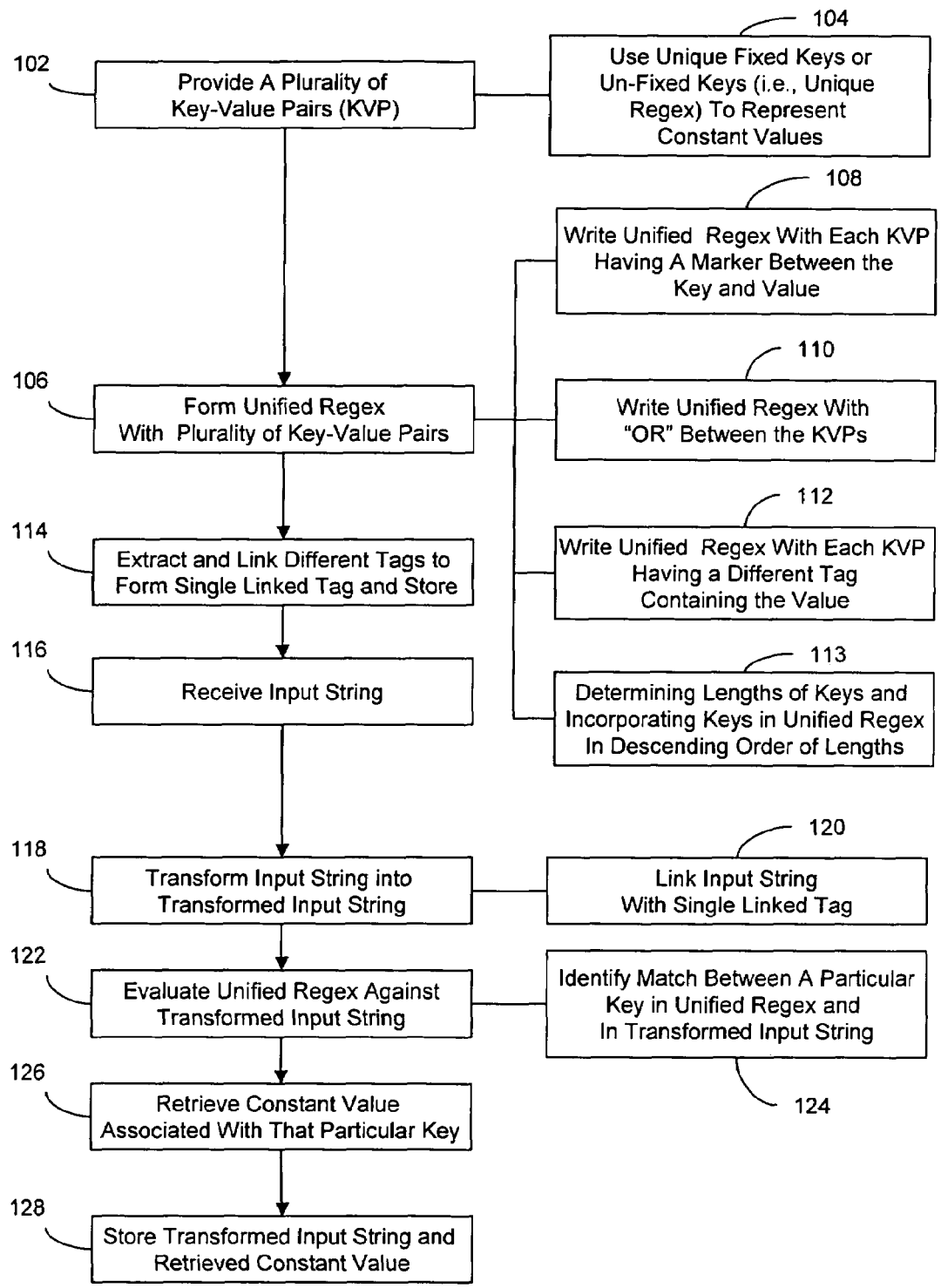
FIG. 1 is a schematic flow diagram of an embodiment of the method of the invention.

The present invention and the various features and advantageous details thereof are explained more fully with reference to the non-limiting embodiments that are illustrated in the accompanying drawings and detailed in the following description. It should be noted that the features illustrated in the drawings are not necessarily drawn to scale. Descriptions of well-known components and processing techniques are omitted so as to not unnecessarily obscure the present invention. The examples used herein are intended merely to facilitate an understanding of ways in which the invention may be practiced and to further enable those of skill in the art to practice the invention. Accordingly, the examples should not be construed as limiting the scope of the invention.

As mentioned above, there is a need for a method of retrieving constant values (i.e., performing a lookup operation) for keys in associative memory arrays in order to make such associative memory arrays practical for incorporation into large scale systems. Specifically, there is a need for a faster and more efficient method of retrieving constant values associated with particular keys. Additionally, there is a need for such a method that can retrieve constant values using keys that are un-fixed (i.e., keys that may have alternatives, restrictions, exceptions, qualifications, etc.).

Therefore, disclosed herein is a computer-implemented method of retrieving constant values from an associative memory array. One embodiment of the method comprises compiling multiple key-value pairs into a unified regular expression, transforming an input string, evaluating the transformed string against the unified regular expression to identify a match between a single particular key in the unified regular expression and the same key in the transformed input string and extracting the single constant value associated with the match. Another embodiment of the method further comprises associating the constant value in each key-value pair with an un-fixed key (i.e., a unique regular expression) as opposed to a fixed key.

More particularly, referring to FIG. 1, a plurality of key-value pairs is provided (102). Each key-value pair comprises a particular key and a constant value associated that particular key. Each particular key is unique and can be either fixed or un-fixed (104). For example, for each key-value pair the particular key can be either a unique fixed word, number, phrase, etc. or a unique regular expression (regex) that may have alternatives, restrictions, exceptions, qualifications, etc. A regular expression is a convention that uses a sequence of characters, markers, symbols, etc., to represent a specific pattern that is to be matched against a string (i.e., text). Those skilled in the art will recognize that any suitable programming language (e.g., C++, Perl, Java, etc.) may be used to write these regular expressions. For example, a first key (i.e., key1) may be represented by the unique C++ regular expression of a.b (i.e., Match any string of length 3 starting with 'a' and ending with 'b' with any single character in between), a second key (i.e., key 2) may be represented by the unique C++ regular expression of a.*b (i.e., Match any arbitrary length string starting with 'a' and ending with 'b'), etc. During a compilation phase of the method, multiple key-value pairs are complied into a unified regular expression for lookup (i.e., a unified regular expression is formed with the key-value pairs) (106).

Specifically, the unified regular expression can be written with each of the key-value pairs having a marker between the particular key and the constant value for that particular key (108) and with an "OR" logical connective between each of the key-value pairs (110). The unified regular expression can further be written such that for each key-value pair the constant value and marker associated with the particular key for that pair forms a different tag (i.e., a tag unique to that particular key-value pair) (112). Again, those skilled in the art will recognize that any suitable programming language (e.g., C++, Java, Perl, etc.) may be used to write the regular expressions of the invention. For example, individual key-value pairs, such as, key1=value1, key2=value2, and key3=value 3 can be combined and appended together to form a unified regular expression in C++ of "key1.*@(value1)|key2.*@(value2)|key3.*@(value3)". This unified regular expression can be formed in such a way that the lengths of the keys are determined and the keys are sorted and incorporated into the unified regular expression in descending order (i.e., longest to shortest) (113). It can be advantageous to incorporate the keys into the uniformed regular expression in the manner because multiple regular expressions can potentially match against the same input string and the shorter the regular expression, the more general it becomes. Thus, the shorter keys should be placed at the end of the unified regular expression. Additionally, the special marker appended to each key is represented in this unified regular expression by the characters ".*@". It is anticipated that any suitable characters may be used as these special markers. The keys (e.g., key1, key 2 and key 3) represented in this unified regular expression are ORed together with a logical connective (i.e., the metacharacter "|" meaning the logical "or").

Each of the different tags in the unified regular expression is then extracted and linked (i.e., concatenated) to form a separate single linked tag, which is stored for future use (114). For example, the different tags, "@value1", "@value2", and "@value 3", of the unified regular expression, "key1.*@(value1)|key2.*@(value2)|key3.*@(value3)", will be extracted and concatenated to form the single linked tag of "@value1@value2@value3".

As each new key-value pair is added to the associative array, the compile phase will be repeated so that each key-value pair is represented in the first regular expression and in the single linked tag.

During evaluation phase, an input string (i.e., a query) that is to be matched against the unified regular expression is received (116). That input string is transformed into a transformed input string by linking it (i.e., concatenating it) with the single linked tag (118-120). This transformed input string is then evaluated against the unified regular expression to find a match between a single particular key in the unified regular expression and the same key in the transformed input string (122-124). For example, if "abc" is the input string that is received (at process 116), then the input is transformed by concatenating the unified tag '@value1@value2' to produce "abc@value1@value2" (at processes 118-120). The transformed string is then evaluated against the unified regular expression (at process 122). Specifically, evaluation is performed against the unified regular expression in such a way that enables sub matches to be found.

When there is a match associated with a single particular key, the associated constant value can be extracted (126), e.g., using the pmatch, nmatch value returned as part of regular expression lookup. For example, if we have a unified regular expression of a?c.*@(val1)|c?f.*@(val2)" and the transformed input string is 'abc@val1', then the first match will be for 'abc' and the second match will be for 'val1'.

An example application program interface (API) summary for the method follows:

---

RegexKeyValue
{
Public:
    RegxKeyValue(vector<pair<const char *, const char *>> kvlist);
//create the list
    bool eval(const char *input, const char *&value); // Evaluate the input string. Value points to the associated value on return
    void addKeyAndValue(pair<const char*,const char*>); // Add a new key value pair and recompile..
};

---

Once the evaluation process is completed, the transformed input string and any matches can be stored for further use (128).

The method of the invention may be implemented using an entirely hardware embodiment, an entirely software embodiment or an embodiment containing both hardware and software elements. For example, an embodiment may be implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

Figure 2:
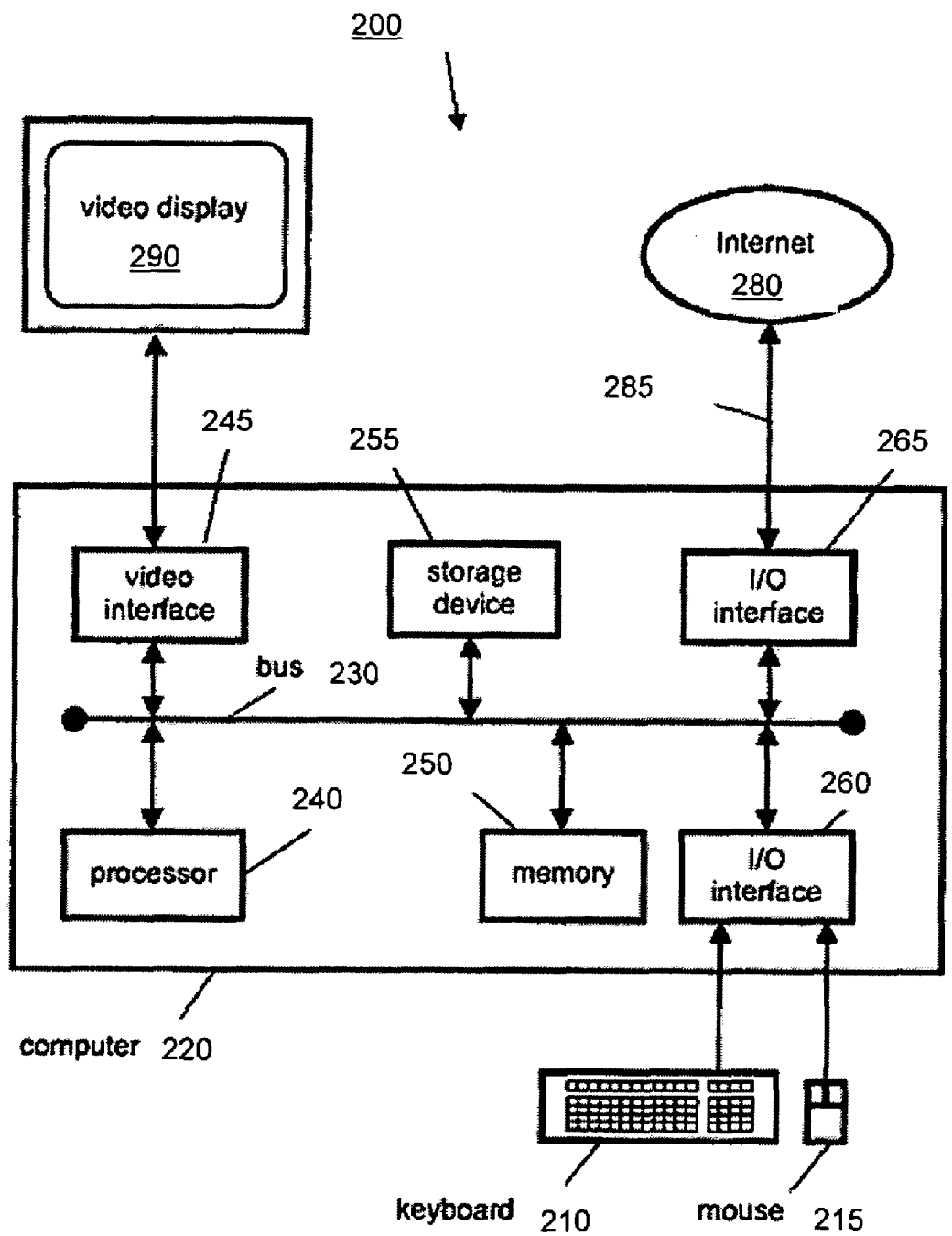
FIG. 2 is a schematic representation of a computer system suitable for implementing the method of the invention as described herein.

FIG. 2 is a schematic representation of a computer system 200 that can be used for implementing the method of the invention as described herein. Computer software executes under a suitable operating system installed on the computer system 200 to assist in performing the described techniques. This computer software can be programmed using any suitable computer programming language, and may comprise various software code means for achieving particular steps. The components of the computer system 200 can include a computer 220, a keyboard 210 and a mouse 215, and a video display 290. The computer 220 can include a processor 240, a memory 250, input/output (I/O) interfaces 260, 265, a video interface 245, and a storage device 255. The processor 240 can be a central processing unit (CPU) that executes the operating system and the computer software executing under the operating system. The memory 250 can include random access memory (RAM) and read-only memory (ROM), and can be used under direction of the processor 240. The video interface 245 can be connected to video display 290. User input to operate the computer 220 can be provided from the keyboard 210 and mouse 215. The storage device 255 can include a disk drive or any other suitable storage medium. Each of the components of the computer 220 can be connected to an internal bus 230 that includes data, address, and control buses, to allow components of the computer 220 to communicate with each other via the bus 230. The computer system 200 can be connected to one or more other similar computers via input/output (I/O) interface 265 using a communication channel 265 to a network, represented as the Internet 280. The computer software may be recorded on a portable storage medium, in which case, the computer software program is accessed by the computer system 200 from the storage device 255. Alternatively, the computer software can be accessed directly from the Internet 280 by the computer 220. In either case, a user can interact with the computer system 200 using the keyboard 210 and mouse 215 to operate the programmed computer software executing on the computer 220. Other configurations or types of computer systems can be equally well used to implement the described techniques. The computer system 200 described above is described only as an example of a particular type of system suitable for implementing the described techniques.

Therefore, disclosed above is a computer-implemented method of retrieving constant values from an associative memory array. One embodiment of the method comprises compiling multiple key-value pairs into a unified regular expression, transforming an input string, matching a single particular key in both the unified regular expression and the transformed input string and extracting the constant value associated with that single particular key. The input string in transformed by linking different tags associated with each key-value pair in the unified regular expression into a single linked tag and then, linking the single linked tag to the input string. This allows the transformed input string to be matched against multiple keys in the array during a single process and avoids the need to separately match the input string against each key in the array. Another embodiment of the method further comprises associating the constant value in each key-value pair with an un-fixed key (i.e., a unique regular expression) as opposed to a fixed key. This allows different input strings to match to the same key in order to retrieve the same constant value. Consequently, the method reduces processing time and limits the number of keys required in the array, thereby, making associative arrays practical for large scale systems requiring frequent lookup operations.

While the invention has been described in terms of embodiments, those skilled in the art will recognize that the invention can be practiced with modification within the spirit and scope of the appended claims.

What is claimed is:

1. A computer-implemented method of retrieving constant values, in an associative memory array, said method comprising:

providing a plurality of key-value pairs for said associative memory array, wherein each key-value pair comprises a particular key and a constant value associated with that particular key;

compiling said key-value pairs to form a unified regular expression, said compiling comprising:

writing said unified regular expression with each of said key-value pairs having a marker between said particular key and said value for said particular key such that, for each one of said key-value pairs, said marker and said constant value form a unique tag;

further writing said unified regular expression with an "OR" logical connective between each of said key-value pairs;

determining lengths for each said particular key; and incorporating each said particular key into said unified regular expression based on a descending order of said lengths;

forming a single liked tag by concatenating each said unique tag from all of said key-value pairs;

receiving an input string;

transforming said input string into a transformed input string by linking said input string to said single linked tag;

evaluating said transformed input string against said unified regular expression to identify a match between a single particular key located in said unified regular expression and in said transformed input string; and retrieving, from said associative memory array, a single constant value associated with said single particular key that is located in said unified regular expression in said transformed input string; and after identifying said match, storing said transformed input string and said single constant value.

2. A program storage device readable by computer and tangibly embodying a program of instructions executable by said computer to perform a method of retrieving constant values in an associative memory array, said method comprising:

provisioning a plurality of key-value pairs for said associative memory array, wherein each key-value pair comprises a particular key and a constant value associated with that particular key;

compiling said key-value pairs to form a unified regular expression, said compiling comprising:

writing said unified regular expression with each of said key-value pairs having a marker between said particular key and said value for said particular key such that, for each one of said key-value pairs, said marker and said constant value form a unique tag;

further writing said unified regular expression with an "OR" logical connective between each of said key-value pairs;

determining lengths for each said particular key; and incorporating each said particular key into said unified regular expression based on a descending order of said lengths;

forming a single liked tag by concatenating each said unique tag from all of said key-value pairs;

receiving an input string;

transforming said input string into a transformed input string by linking said input string to said linked tag;

evaluating said transformed input string against said unified regular expression to identify a match between a single particular key locate din said unified regular expression and in said transformed input string; and retrieving, from an associative memory array, a single constant value associated with said single particular key that is located in said unified regular expression and in said transformed input string; and after identifying said match, storing said transformed input string and said single constant value.

* * * * *